United States Patent [19]

Langewisch

[11] 4,244,588
[45] Jan. 13, 1981

[54] SHEAR SEAL ASSEMBLY

[75] Inventor: Stewart A. Langewisch, Blue Grass, Iowa

[73] Assignee: Caterpillar Tractor Co., Peoria, Ill.

[21] Appl. No.: 127,999

[22] PCT Filed: Nov. 5, 1979

[86] PCT No.: PCT/US7900943

§ 371 Date: Nov. 5, 1979

§ 102(e) Date: Nov. 5, 1979

[51] Int. Cl.³ .................... F16J 15/50; F16J 15/56
[52] U.S. Cl. ................................... 277/5; 277/30;
  277/33; 277/95; 277/97; 277/188 A; 277/DIG. 9; 305/11; 301/132
[58] Field of Search .................... 277/5, 12, 30, 33, 42,
  277/43, 81 R, 92, 95, 97, 165, 188 R, 188 A,
  DIG. 9; 305/11, 12, 42; 301/131, 132

[56] References Cited

U.S. PATENT DOCUMENTS

| 418,439 | 12/1889 | Brill | 277/95 |
|---|---|---|---|
| 2,911,840 | 11/1959 | Muller et al. | 305/11 X |
| 3,094,335 | 6/1963 | Shenk | 277/5 |
| 3,218,107 | 11/1965 | Reinsma | 277/5 X |
| 3,341,259 | 9/1967 | Schulz et al. | 305/11 |
| 3,620,578 | 11/1971 | Fix | 305/11 |
| 3,680,924 | 8/1972 | Otto et al. | 305/11 |

FOREIGN PATENT DOCUMENTS

| 710143 | 9/1941 | Fed. Rep. of Germany | 277/95 |
|---|---|---|---|
| 879496 | 6/1953 | Fed. Rep. of Germany | 277/95 |
| F 13560 | 10/1955 | Fed. Rep. of Germany | 305/11 |
| 499167 | 5/1974 | U.S.S.R. | 305/11 |

*Primary Examiner*—Robert S. Ward, Jr.
*Attorney, Agent, or Firm*—Ralph E. Walters

[57] ABSTRACT

A shear seal assembly (80) for sealing between two members (22,36) having limited relative motion therebetween has an inner sleeve (86), an outer sleeve (88), and an elastomeric member (90) connecting the sleeves (86,88). The inner sleeve (86) is in a press fit relationship with one of the members (22) and the outer sleeve (88) is in a press fit relationship with the other of the members (36). Thrust members (92,93) extending radially outwardly along the sides (94,96,98,99) of the seal assembly (80) control distortion thereof and prevent damage thereto. A protective member (93, 100) prevents the ingress of external contaminants and abrasives into the area to be sealed.

11 Claims, 4 Drawing Figures

SHEAR SEAL ASSEMBLY

DESCRIPTION

1. Technical Field

This invention relates generally to shear seals and, more particularly, to a shear seal between two members having limited relative motion therebetween.

2. Background Art

The use of shear seals to seal between members having a limited degree of motion relative to one another is well known in the art. For example, in earthmoving equipment applications wherein vehicles normally operate in environments which contain a considerable amount of abrasive contaminants, shear seals are employed to retain lubricants and prevent the ingress of contaminants into articulated joints. Joints of this nature which are subject to abrasive contaminants and therefore require sealing typically include the pivot connections between the links in track chains, lift arm connections, track roller frame pivot joints and the like.

Examples of seals which may be used in these applications are disclosed in U.S. Pat. No. 3,218,107 to Harold L. Reinsma, issued Nov. 16, 1965 and in U.S. Pat. No. 3,680,924 to Robert J. Otto et al, issued Aug. 1, 1972. The Reinsma patent discloses a shear seal having an inner sleeve pressed onto a track pin and an outer sleeve pressed into a link. The Otto patent discloses a shear seal for a track pin of an endless track having an inner metal ring of the seal pressed or cemented into one link and an outer metal ring pressed into an adjacent link. In both disclosures, the inner and outer sleeves or metal rings are joined by an annular elastomeric ring positioned therebetween. In addition, the relative tolerances between the rings or sleeves and their mating surfaces must be closely controlled.

A particular problem is encountered in the assembly of shear seals into the mechanism to be sealed. Normally, a shear seal is installed with one of the inner or outer sleeves in a press fit relationship in one of the members to be sealed. As the members are assembled, the other of the inner or outer sleeves is installed in a press fit relationship in the second member to be sealed, for example, into a bore or onto a shaft. The assembly force tends to distort or deflect the seal, which, if uncontrolled, will damage the elastomeric material and/or damage the bond between the elastomeric material and the inner and/or outer sleeves of the shear seal.

The foregoing illustrates limitations of the known prior art. Thus, it is apparent that it would be advantageous to provide an alternative to the prior art.

DISCLOSURE OF THE INVENTION

In one aspect of the present invention, improved assembly is accomplished by providing a shear seal assembly for sealing between two members having limited relative rotation therebetween. The shear seal has an inner sleeve connected to one of the members, an outer sleeve connected to the other member, and an annular elastomeric member connected therebetween. Thrust means extends radially between the inner and outer sleeves adjacent the sides thereof for maintaining the shear seal flat during assembly and removal. They distribute the forces evenly thereon and prevent damage to the elastomeric member.

In another aspect of the present invention many of the above-described advantages are attained by positioning thrust means extending radially adjacent one side of the inner and outer sleeves for maintaining the shear seal flat during assembly.

The improved construction is effective in sealing the members and permits limited relative motion therebetween. Connecting the inner and outer sleeves to the movable members eliminates any relative motion between the seal and any other parts and, therefore, eliminates groove wearing and resultant leakage. The thrust means permits installation of the seal and assembly of the sealed members without tearing the elastomeric member or otherwise damaging the seal assembly.

The foregoing and other aspects will become apparent from the following detailed description of the invention when considered in conjunction with the accompanying drawings. It is to be expressly understood, however, that the drawings are not intended as a definition of the invention but are for the purpose of illustration only.

BEST MODE FOR CARRYING OUT THE INVENTION

Figure 1:
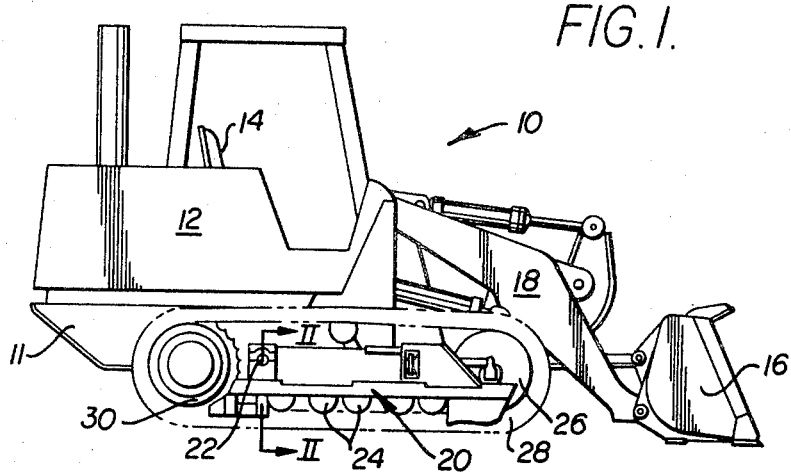
FIG. 1 is a side elevational view of a track-type tractor embodying the present invention.

An earthmoving vehicle or track-type tractor 10 is illustrated in FIG. 1 and includes a main frame 11, an engine compartment 12, an operator's station 14, a bucket 16 secured to the tractor by a pair of lift arms 18, and a track roller frame 20 mounted on a pivot bar or shaft 22 which is secured to the vehicle. The track roller frame supports a plurality of track rollers 24, a front idler 26, and a track 28 encircling a final drive sprocket 30, the rollers, and the idler.

Figure 2:
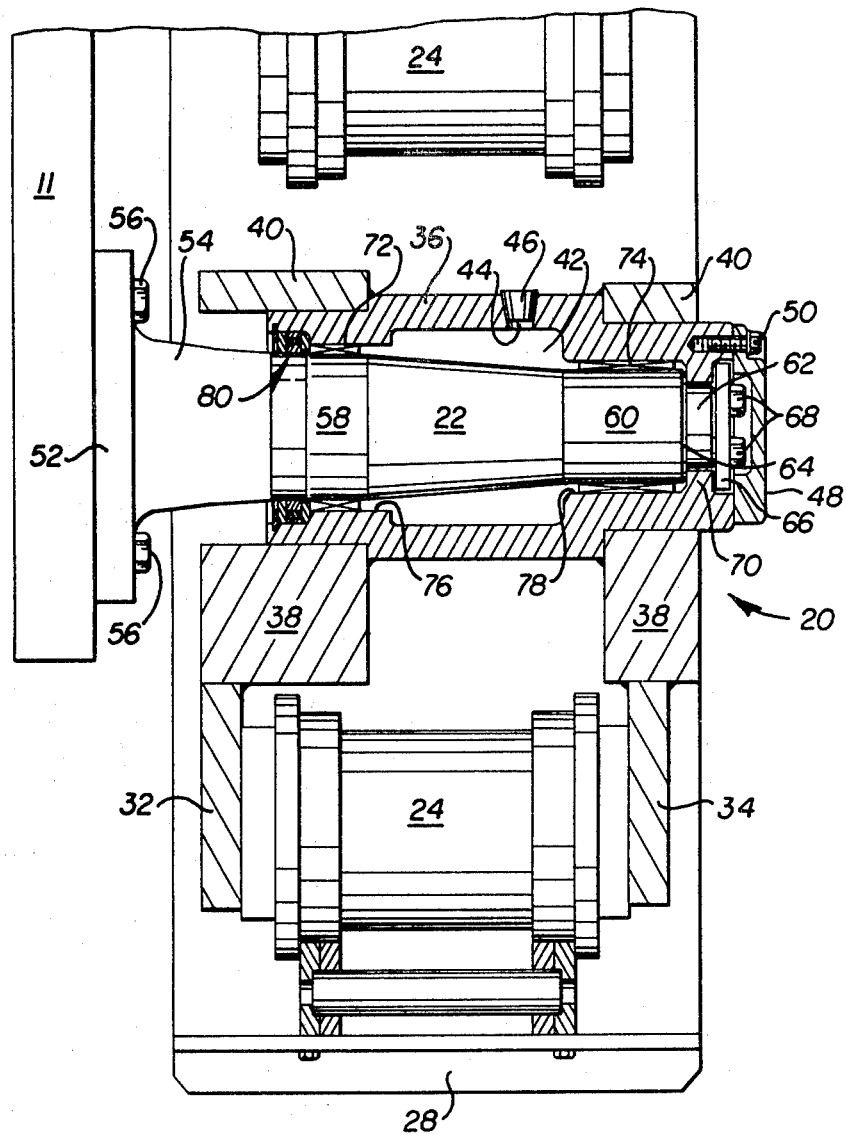
FIG. 2 is an enlarged sectional view taken along the line II—II of FIG. 1.

As shown in FIG. 2, the track roller frame 20 has an inner rail 32 and an outer rail 34 with a tubular housing or sleeve 36 secured therebetween by pairs of spaced pillow blocks 38 and caps 40. The sleeve includes a lubricant receiving cavity 42, an orifice or port 44 for adding lubricant to the cavity, and a plug or stopper 46 to prevent leakage of lubricant through the port. An end cap or cover plate 48 is bolted at 50 to an open end of the sleeve to prevent leakage of lubricant therefrom. Additional sealant, for example liquid gasket material, may be applied to the cap to ensure positive sealing at the cap/sleeve interface.

The pivot shaft 22 includes a flange 52 extending radially outwardly from a first end 54 and bolted at 56 to the main frame 11. The shaft extends axially outwardly from the frame into the sleeve 36 and further includes first and second bearing surfaces 58 and 60 and a second end 62 of a diameter smaller than the adjacent portion of the shaft and separated therefrom by a face 64. A retaining plate 66 is bolted at 68 to the second end portion in clamping relationship with a circumferential flange 70 extending inwardly from the sleeve intermediate the face and the retaining plate. First and second bearing sleeves 72 and 74 are connected to the tubular housing, for example in a press fit relationship in bearing receiving bores 76 and 78, and are so arranged as to be in bearing engagement with the bearing surfaces 58 and 60 respectively.

Figure 3:
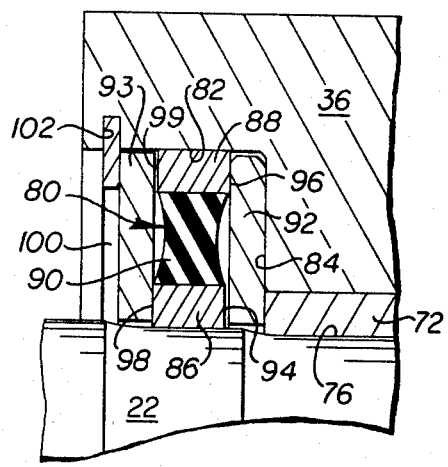
FIG. 3 is a further enlarged partial sectional view of the shear seal assembly of FIG. 2; and, FIG. 4 is an enlarged partial sectional view of an alternate embodiment of the shear seal assembly of the present invention.

As shown in FIG. 2 and as illustrated in greater detail in FIG. 3, a shear seal assembly 80 is disposed in a counterbore 82 formed in one end of the sleeve 36 adjacent the bore 76 and separated therefrom by a thrust surface or face 84. In the embodiment shown, the shear seal assembly includes an inner sleeve 86 of cylindrical shape press fitted onto the shaft 22 and an outer sleeve 88 also of cylindrical shape press fitted into the counterbore. The sleeves are joined by an annular ring or disc 90 having elastomeric properties which permit limited relative motion between the sleeves in response to corresponding motion between the shaft and the tubular housing and allow the ring to return to its original, unstressed shape when an applied load is removed.

A thrust member, for example an annular washer 92, is positioned on the shaft 22 and extends radially outwardly therefrom intermediate the thrust surface 84 and along a first side 94,96 of the inner and outer sleeves 86,88 respectively for pressing the seal assembly onto the shaft. Similarly, to remove the seal assembly from the shaft, a second thrust member or annular washer 93 extends radially outwardly from the shaft adjacent to a second side 98,99 of the respective inner and outer sleeves. A snap ring 100 inserted in a groove 102 extending circumferentially around the counterbore 82 retains the thrust washer in position adjacent the seal assembly and cooperates with the washer in preventing damage to the shear seal during disassembly and in protecting the elastomeric ring 90 of the shear seal from abrasives.

Figure 4:
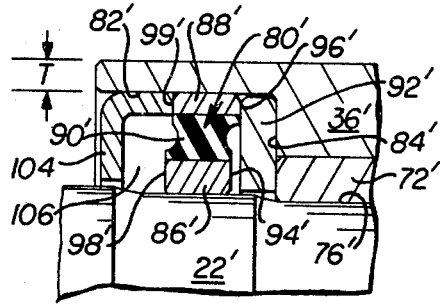

Referring now to FIG. 4, there is illustrated an alternate embodiment of the shear seal assembly of the present invention. The shear seal assembly 80' comprises an inner and an outer sleeve 86',88' connected by an elastomeric ring 90' and in press fit relationship with respective first and second members to be sealed 22',36'. By way of illustration, the inner sleeve is press fit onto a shaft 22', and the outer sleeve is press fit into a counterbore 82' formed in an end of a tubular housing or sleeve 36'. As hereinbefore described, a thrust member or washer 92' is disposed adjacent and intermediate respective first sides 94',96' of the inner and the outer sleeves and a thrust face 84' separating the counterbore from a bore 76' having a bearing sleeve 72' inserted therein.

As can be seen in the drawing, the material thickness T of the portion of the sleeve surrounding the counterbore is relatively thin and therefore of insufficient strength to accommodate the stresses which, during operation of the assembly, would be imposed thereon by a second thrust member and a snap ring. However, it is still desirous to protect the elastomeric ring of the shear seal from abrasives. To this end, an end cap or plug 104 is pressed into the counterbore forming a protective labyrinth 106 adjacent the seal assembly.

INDUSTRIAL APPLICABILITY

With the parts assembled as set forth above, the improved shear seal assembly 80 of the present invention has application wherever two members are relatively rotatable to a limited degree and sealing is required therebetween. One such application is between a track roller frame 20 and a pivot shaft 22 for mounting the frame to a vehicle 10.

An outer sleeve 88 of the seal assembly 10 is pressed into a tubular housing or sleeve 36 and the inner sleeve 86 of the seal is pressed onto the pivot shaft 22. The press fit relationship between the inner and outer sleeves and the sealed members provides positive sealing at the mating surfaces, and the elastomeric member 90 interconnecting the inner and outer sleeves permits limited relative motion therebetween. A sealant, for example, a thread or other sealant, may also be applied to both press fits to seal any small surface irregularites.

A pair of thrust washers 92 and 93 positioned on the shaft 22 and extending radially outwardly therefrom adjacent the sides 94,98,96,99 of the inner and outer sleeves 86,88 respectively uniformly distribute the pressing forces required to assemble and disassembly the sleeve 36 and the shaft. Deflection of the seal assembly 80 is thus controlled and damage thereto is prevented. The outermost thrust member 93 further cooperates with a retainer or snap ring 100 in preventing ingress of contaminants and abrasives into the sealed area and resultant damage thereto.

In certain application, for example, in sealing between relatively small shafts and sleeves of thin wall construction, the material strength required to retain a thrust member with a snap ring is often lacking. However, the seal assembly 80' may still be protected from external contamination by pressing an L-shaped, labyrinth forming plug 104 into the counterbore 82' to prevent ingress of abrasives therein.

The shear seal assembly 80 of the present invention has further application for sealing between members having small radial displacements resulting, for example, from bearing wear and assembly tolerances. It may also be used in areas having small axial displacements due to assembly tolerances and wear, such as at the face 64 of FIG. 2 and at both faces of the circumferential flange 70 also shown in FIG. 2.

While the invention has been described with reference to two embodiments, it will be understood by those skilled in the art that various changes may be made and equivalents may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

I claim:

1. In a seal assembly (80/80') for sealing between first and second members (22,36/22',36') having limited relative motion therebetween, the seal assembly (80,80') including an inner sleeve (86/86'), an outer sleeve (88/88'), and an annular elastomeric member (90/90') connected between the sleeves (86,88/86',88'), the inner and outer sleeves (86,88/86',88') each including first and second side portions (94,98,96,99/94',98',96',99'), the second member (36/36') having first and second bores (76,82'/76',82') and a thrust surface (84/84') therebetween, the improvement comprising:

thrust means (92,93,102/92') extending radially from the inner to the outer sleeves (86,88/86',88') and adjacent thereto, the outer sleeve (88/88') being connected to the second bore (82/82') and the inner sleeve (86/86') being connected to the first member (22/22').

2. The seal assembly of claim 1 wherein the outer sleeve (88/88') is press fitted into the second bore (82/82').

3. The seal assembly of claim 1 wherein the inner sleeve (86/86') is press fitted onto the first member (22/22').

4. The seal assembly of claim 1 wherein the thrust means (92,93,100/92') comprises a thrust member (92/92') positioned intermediate the thrust surface (84/84') and the first sleeve side portions (94,96/94',96').

5. The seal assembly of claim 4 wherein the thrust means (92,93,100/92') includes a second thrust member (93) positioned adjacent the second sleeve side portions (98,99) and a snap ring (100) connected to the second member (36).

6. The seal assembly of claim 4 wherein the thrust member (92/92') is an annular ring (92,92').

7. The seal assembly of claim 5 wherein the second thrust member (93) is an annular ring (93).

8. The seal assembly of claim 1 including means (93,100/104) for preventing the ingress of abrasives and contaminants into the seal assembly (80/80').

9. The seal assembly of claim 8 wherein the preventive means (93,100/104) is an L-shaped plug (104).

10. The seal assembly of claim 9 wherein the plug (104) is press fitted into the second member (36').

11. The seal assembly of claim 8 wherein the preventive means (93,100/104) is a snap ring (100) connected to the second member (36) and an annular ring (93) positioned intermediate the snap ring (100) and the second sleeve side portions (98,99).

* * * * *